United States Patent Office 3,594,476
Patented July 20, 1971

3,594,476
SUBMICRON AQUEOUS AEROSOLS
CONTAINING LECITHIN
Edward W. Merrill, Cambridge, Mass., assignor to Massachusetts Institute of Technology, Cambridge, Mass.
No Drawing. Filed May 12, 1969, Ser. No. 823,972
Int. Cl. A61j 3/02; A61k 13/00
U.S. Cl. 424—199          4 Claims

ABSTRACT OF THE DISCLOSURE

Aerosols of aqueous particles of submicron diameter which are stable against evaporation and suitable to be readily transmitted to the alveoli of the lung by inspiration, may be prepared from aqueous lecithin dispersions nebulized, as by an ultrasonic nebulizer, at temperatures greater than about 25° C. Lecithin aerosols thus prepared are useful for the treatment of lung disorders, and may optionally contain other therapeutic agents such as antibiotics.

---

This invention relates to the preparation of aqueous aerosols, and in particular to aqueous aerosols containing lecithin of sufficiently small particle size to be inspired into the alveoli of the lung.

Many efforts have been made to prepare aqueous aerosols of sub micron particle size small enough to be inhaled into the alveoli of the lung, and also to prepare aerosols containing lecithin which is known to be useful in the treatment of various lung disorders.

Aqueous aerosols of extremenly small particle size, e.g., less than one micron, are characterized by extreme instability because of the very rapid rate at which particles of this size evaporate in favor of the growth of particles of much larger diameter. As a consequence there has not been any reliable means for preparing aqueous aerosols of such small particle size. Prior attempts to prepare aerosols containing lecithin have utilized Freon type gasses, themselves toxic, or have made use of mixtures of water and glycol type compounds of low vapor pressure that avoid the evaporation problem.

I have now discovered that aqueous, or essentially aqueous, aerosols can be prepared by dispersing lecithin in water, and then nebulizing the dispersion at a temperature in excess of about 25° C. It appears that at about 25° C. DL dipalmitoyl-α-lecithin undergoes a transformation, evidenced, inter alia, by a marked decrease in its surface viscosity, the effect of which is to permit the formation of staple aqueous particles of less than one micron diameter.

Aerosols thus prepared are of particle size generally between 0.2 and 1 micron in diameter and have been shown to be useful in the treatment of respiratory distress syndrome and hyaline membrane disease, for which lecithin is known to be therapeutic. Robillard, J. E., et al. Aerosol Administration of Synthetic β,γ Dipalmitoyl-L-α-Lecithin in the Respiratory Distress Syndrome: A Preliminary Report, Canad. Med. Ass. J., Jan. 11, 1964, vol. 90, pp. 55 ff. By the use of this invention a convenient and effective means of carrying the lecithin into the alveoli of the lungs is provided.

In addition aerosols prepared pursuant to this invention may be utilized as carriers for therapeutic and diagnostic reageants or other medicants.

In preparing a solution for aerosolization (nebulization) it is only necessary to suspend between 100 milligrams and 5 grams of the DL dipalmitoyl-α-lecithin in 100 ml. of water, or preferably an isotonic saline solution, and dissolving in the solution any desired other medicant or reagent. Prior to nebulization the solution should be heated to at least about 25° C. (but preferably to not more than 75° C.) and then subjected to nebulization by conventional means. An ultrasonic nebulizer operating at about 800,000 Hz. at 15 watts energy is sufficient. A suitable device is the Ultramist III which is marketed by Macronsonics Corp. 88 Elston Street, Rahway, N. J. 07065.

It is interesting to note in passing that the literature pertaining to the Ultramist III states that "traces of surface-active agents (soap, for instance) considerably alter the mechanism of ultrasonic fogging at the air/liquid interface and may even suppress it completely."

The following example sets forth a preferred procedure for practicing the invention.

Two grams of DL-dipalmitoyl-α-lecithin are dispersed in 100 milliliters of a 0.15M aqueous sodium chloride solution using a sonic cavitation generator (Branson Heat Systems Sonifier W185 D, 20 kHz.). After dispersion the solution containing the lecithin is heated to a temperature greater than about 25° C., preferably to about 37° C. when the aerosol is to be administered to human beings, and is then aerosolized in an ultrasonic generator, such as the Ultramist III, previously identified. In the operation of the ultrasonic generator a carrier air stream is supplied to carry away the aerosol and it is preferred that this also be heated to about 37° C. The rate of air flow should be adjusted to between 1 and 12 inches per second. (¾–9 cu. in./sec.)

A description of the ultrasonic generator and its operation is contained in Boucher, R. M. G., and J. Kreuter, The Fundamentals of the Ultrasonic Atomization of Medicated Solutions, Annals of Allergy, Volume 26, November 1968, page 591 ff.

In general it will be noted that the suspensions from which the aerosols are produced according to this invention contain water as the principal volumetric component, and lecithin as the principal surface active agent. In addition to the DL dipalmitoyl-α-lecithin, it is contemplated that others may be used which contain, per molecule, two residues from other acids such as palmitic stearic, or oleic, these being adjacent on the beta and gamma carbons of the glycerol unit, with the phosphatidylcholine on the alpha carbon. The acyl residues may be of either the D, L or DL racemic configurations.

Aerosols described above prepared from a two weight percent DL dipalmitoyl-α-lecithin suspension in saline in air saturated with water vapor at 37° C. have been found to have particle sizes ranging from 0.2 to approximately 1.2 microns. By contrast a controlled saline generated under the same conditions, but without lecithin suspended therein produces particles larger by a factor of 10, as estimated by Stokesian settling velocity.

The lecithin added to water must be dispersed to a colloidal or micellar state of suspension in water by any nondestructive means, of which exposure to ultrasonicly induced cavitation is the most expedient. In addition to the dispersed lecithin, the suspension to be aerosolized may contain cationic components such as sodium, potassium, calcium, and other metal ions, anionic components such as bicarbonate, chloride, sulfate and phosphate ions, non electrolytes such as glucose and other saccharides, and specific chemotherapeutic agents such as pencillin, streptomycin and other antibiotics, radioactive isotopes such as cobalt, strontium, calcium, either in colloidal suspension or in true solution, provided that the total molarity of all the solutes, exclusive of the lecithin, be not more than 2 molal. Colloidal materials other than lecithin must be dispersible into particles having dimensions substantially less than 1000 A.

Water soluble medicants, such as penicillin, streptomycin, ammonium chloride and organic and inorganic radioisotopes do not significantly alter the requirement for the minimum temperature of about 25° C. In contrast, lipid soluble medicants, fluorocarbons, chlorinated hydrocarbons, and most proteins alter the minimum temperature for the aerosolization in an indeterminant way, but the temperature may be determined by routine experimentation.

Although this invention has been described with specific reference to its preferred embodiment it is contemplated that obvious modifications will occur to those skilled in the art and familiar with the principles herein set forth and that such modifications may be made without departing from the scope of this invention. Specially it is contemplated that where the aerosol is to be formed for human administration that the dispersion will be formed under sterile conditions.

Having thus disclosed my invention and described in detail the preferred embodiment thereof, I claim and desire to secure by Letters Patent:

1. The method of preparing an essentially aqueous lecithin aerosol stable against evaporative growth to larger diameter particles, which comprises the steps of dispersing D,L dipalmitoyl-$\alpha$-lecithin in an essentially aqueous medium in the amount of between about 100 milligrams and 5 grams of lecithin to 100 milliliters of said medium, bringing the dispersion to a temperature greater than about 25° C. and forming an aerosol by generating aerosol particles between 0.2 and approximately 1.2 micron in diameter therefrom.

2. The method defined by claim 1 wherein the aerosol is formed in a carrier gas stream.

3. An aerosol composition, stable against evaporative growth, produced in accordance with claim 1, comprising D,L dipalmitoyl-$\alpha$-lecithin dispersed in an essentially aqueous sterile medium in an amount between about 100 milligrams and 5 grams of lecithin to 100 milliliters of said medium.

4. The composition defined by claim 3 wherein the medium is an aqueous isotonic saline solution.

References Cited

UNITED STATES PATENTS

| | | | |
|---|---|---|---|
| 1,988,050 | 11/1935 | Rosenbusch et al. | 424—199 |
| 3,038,816 | 6/1962 | Drell et al. | 424—199UX |
| 3,056,728 | 10/1962 | Ohtaki | 424—199X |

OTHER REFERENCES

Chem. Abstracts 55: p. 20340h (1961).

SHEP K. ROSE, Primary Examiner

U.S. Cl. X.R.

424—1, 40, 43; 252—305, 181, 271